United States Patent [19]

Fitzgerald

[11] Patent Number: 4,497,130
[45] Date of Patent: Feb. 5, 1985

[54] RODENT TRAP

[76] Inventor: John P. Fitzgerald, 119 S. Culver St., Baltimore, Md. 21229

[21] Appl. No.: 513,167

[22] Filed: Jul. 13, 1983

[51] Int. Cl.³ .............................................. A01M 19/00
[52] U.S. Cl. ......................................................... 43/98
[58] Field of Search ..................................... 43/98, 112

[56] References Cited

U.S. PATENT DOCUMENTS

| 1,035,672 | 8/1912 | Ziavin | 43/98 |
| 2,595,130 | 4/1952 | Edwards | 43/98 |
| 3,197,916 | 8/1965 | Cole | 43/98 |
| 3,388,497 | 6/1968 | Levine | 43/98 |
| 3,468,054 | 9/1969 | Levine | 43/98 |
| 4,074,456 | 2/1978 | Tidwell | 43/98 |

FOREIGN PATENT DOCUMENTS 814348  7/1951  Fed. Rep. of Germany .......... 43/98

Primary Examiner—Gene P. Crosby

[57] ABSTRACT

This invention is a rodent trap, including a plastic housing containing an electrical mechanism that electrocutes an entering rodent; the mechanism having two contacts in circuit with a circuit breaker and a power source.

2 Claims, 12 Drawing Figures

RODENT TRAP

This invention relates generally to traps, for use in destroying harmful rodents, such as mice and rats.

It is well known that numerous rodent traps have been designed in the past, and which efficiently rid a premises of rodents. However, many of these only catch the animal, and leave the problem to a person for destroying it afterwards. Other traps are made to both catch and destroy; however some use dangerous chemicals, that must be handled, while others are cumbersome or are dangerous to set, so that there is still a need for a further improved rodent trap.

Accordingly, it is a principal object of the present invention to provide a rodent trap that is more ideal by utilizing modern electrical energy for accomplishing the entire task, and which permits the trap to be small in size, so that it fits conveniently anywhere.

Another object is to provide a rodent trap, which is designed to be safe from electrical hazard when being handled.

Yet a further object is to provide a rodent trap, which may be manufactured in several different models, so as to suit the requirements of various purchasers.

Other objects are to provide a rodent trap, which is simple in design, inexpensive to manufacture, rugged in construction, easy to use, and efficient in operation.

These, and other objects, will be readily evident, upon a study of the following specification, and the accompanying drawing, wherein.

Figure 1:
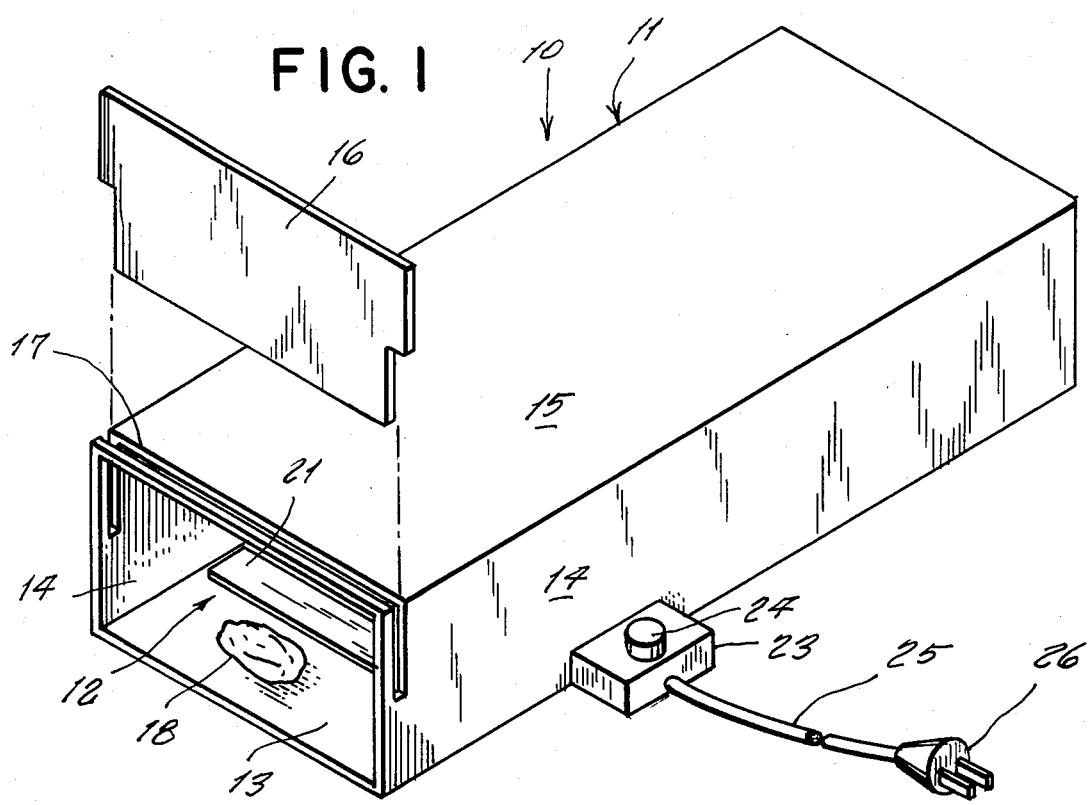
FIG. 1 is a perspective view of the embodiment of the invention, with optional end plate shown in an exploded position.
Figure 2:
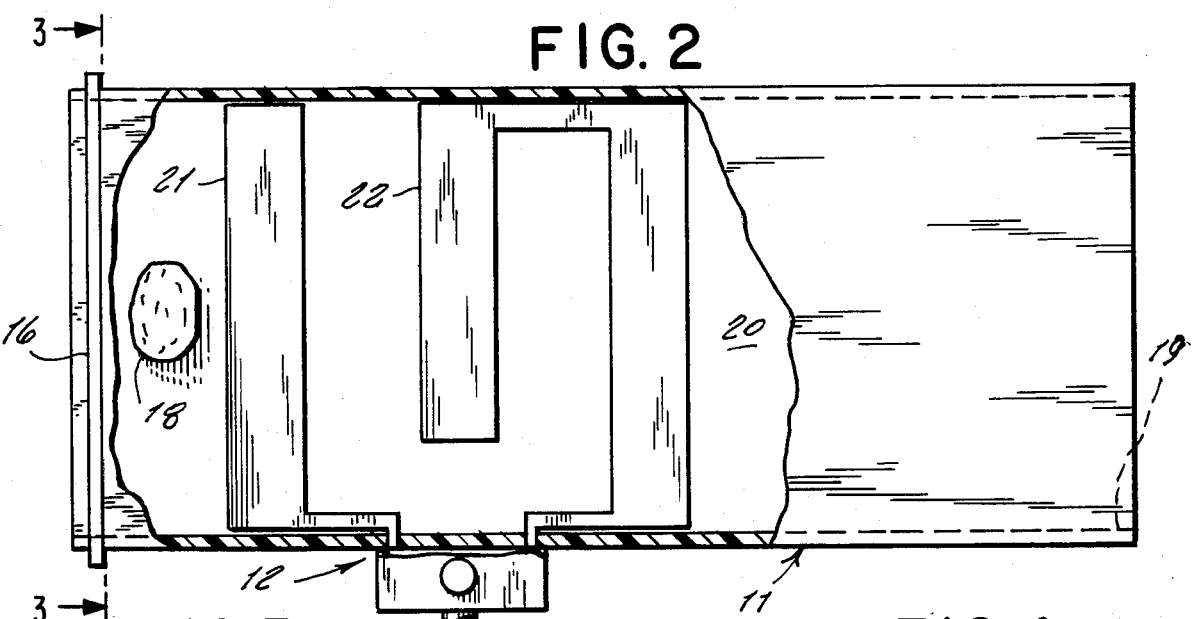
FIG. 2 is a top plan view, partially broken away, of the embodiment of the invention, with the optional end plate shown in place.
Figures 3, 4:
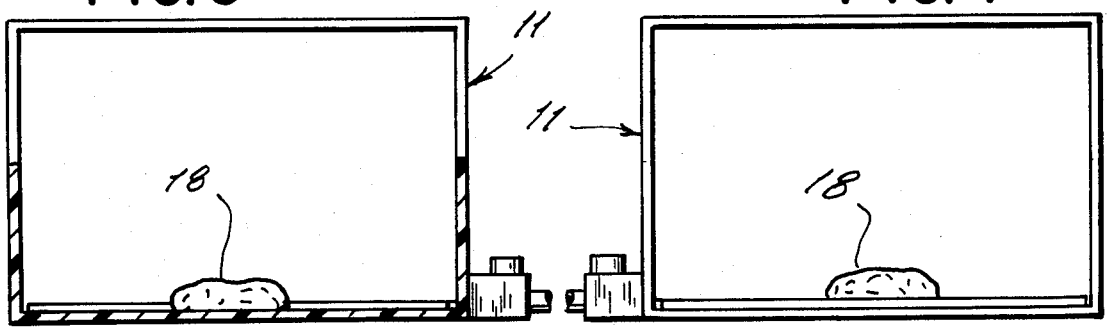
FIG. 3 is a cross-sectional view, taken along lines 3—3 of FIG. 2.
FIG. 4 is an end elevational view, taken from the right side of FIG. 2 with optional end plate not shown.

Referring now to the drawings in greater detail, and more particularly to FIGS. 1 to 4 thereof at this time, the reference numeral 10 represents a rodent trap, according to the present invention, wherein there is a housing 11 of a suitable size for a rodent to enter thereinto, and which contains an electrical mechanism 12, for electrocuting the animal therewithin.

The housing is made of molded plastic material, and includes a base or floor 13, opposite side walls 14 and top wall 15.

A removable end wall 16, at one end of the housing, slides in a notch 17, and permits a person to place a bait 18 conveniently into a closed end of the housing. An opposite end of the housing is left open, so as to serve as an entrance 19 into the interior 20.

The electrical mechanism comprises two flat contact strips 21 and 22, that may be mounted flush upon the floor, and may be of copper or aluminum, so as to be electrically conductive. One end of each strip is connected to a circuit breaker 23, mounted on an outer side of the housing, and which is manually operated by a pushbutton 24. An extension cord 25 from the circuit breaker has a plug 26 on its end, for plugging into a household electric outlet socket. The metal strip 21, located more remotely within the interior of the housing, comprises the live wire of the circuit by being connected to the positive terminal of the circuit breaker.

In operative use, the trap is placed into an area frequented by rodents. The end wall 16 is raised, so that the bait is placed inside the housing, between the strip 21 and the then lowered end wall, and the pushbutton is depressed. Bread crumbs or small bits of other food may be scattered around the trap, so as to attract rodents into the trap vicinity. The rodent, smelling the bait, enters the trap through the open entrance, stepping upon both contact strips, so as to reach the bait, thus closes the circuit with his own body bridging the contacts, and is instantly electrocuted.

Figure 5:
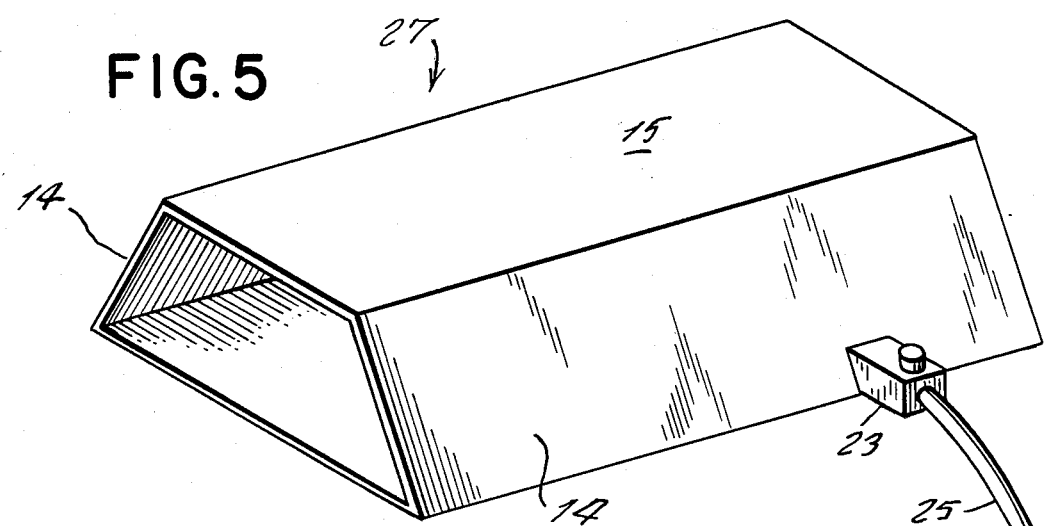
FIG. 5 is a perspective view of a second embodiment of the invention.
Figure 6:
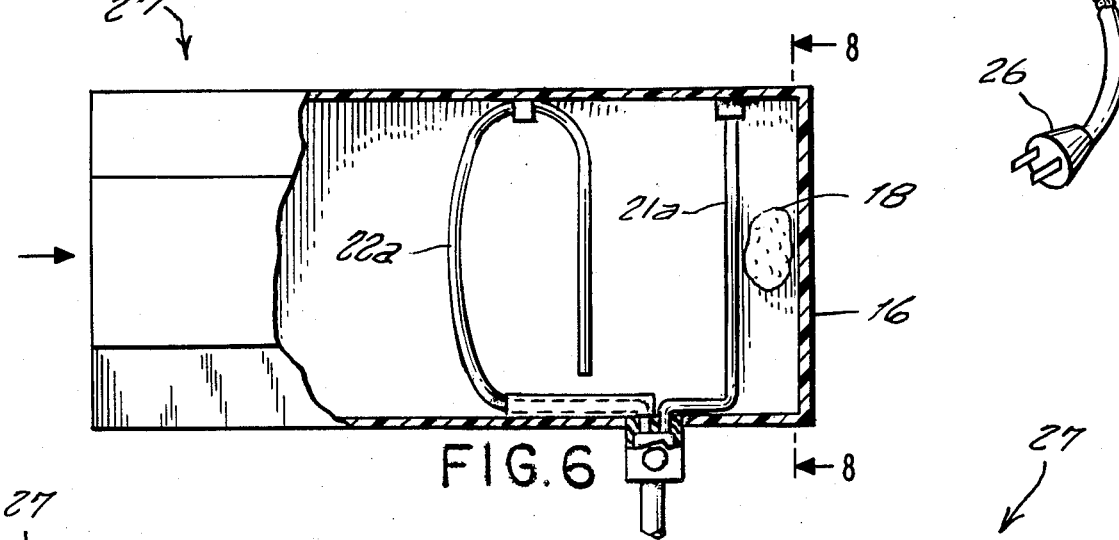
FIG. 6 is a top plan view, partially broken away, of FIG. 5.
Figure 7:
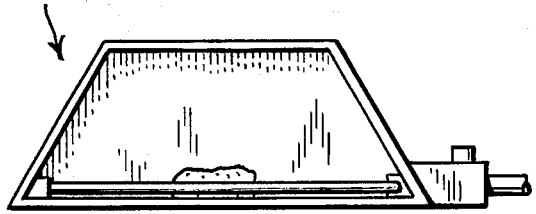
FIG. 7 is a side elevational view of the entrance, taken from the left side of FIG. 6.
Figure 8:
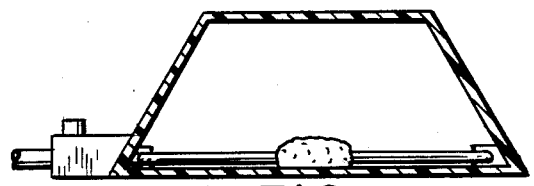
FIG. 8 is a cross-sectional view, taken along the lines 8—8 of FIG. 6.
Figure 9:
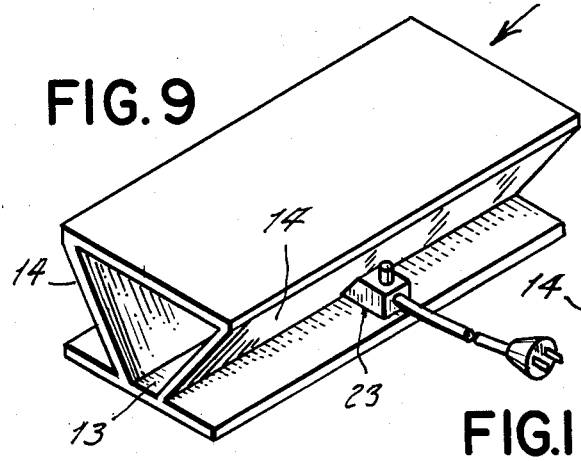
FIG. 9 is a third embodiment of the invention, shown in perspective.

In a modified design of the invention, shown in FIGS. 5 to 9, the rodent trap 27 is the same as rodent trap 10, except that the housing is shaped with the side walls being inclined in an upwardly converging direction, and the flat contact strips being substituted with wires 21a and 22a. Also, the end wall 16 is affixed.

Figure 10:
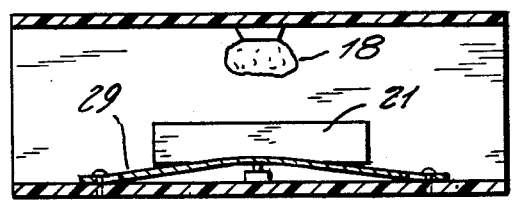
FIG. 10 is a cross-sectional view of FIG. 9, illustrating the invention comprising a spring leaf narrow ramp, (the mouse's weight causes the ramp to move down, closing the contacts of the switch before the mouse reaches for the bait, a circuit breaker opens the circuit to de-energize the electrodes upon instantaneously killed mouse)
Figure 11:
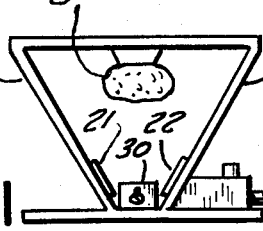
FIG. 11 is a side elevational view, taken from the left end of FIG. 6.
Figure 12:
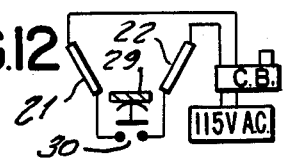
FIG. 12 is a circuit diagram of the electrode ramp and switch device.

In a further modified design, shown in FIGS. 9 to 12, a rodent trap 28 has its side walls upwardly diverging, and there is no end wall, so that a rodent may enter from either end, to try to reach the bait affixed under a center of the top wall. In this design, the strips 21 and 22 are mounted along a lower portion of the side walls, so that they are contacted by opposite sides of the animal's body as it is lowered into the downwardly narrowing interior of the housing, when it steps upon an upwardly arched, flexible, spring steel ramp 29, trying to reach the bait. A switch 30, mounted on the floor, is depressed by the ramp thereabove, due to the weight of the animal on the ramp. The switch is in the electrical circuit of the contact strips; the normally open circuit being thus closed, and killing the rodent.

While various changes may be made in the detail construction, it is understood that such changes will be within the spirit and scope of the present invention, as is defined by the appended claims.

What I now claim is:

1. A rodent trap, comprising, in combination, a plastic housing and an electrical mechanism in said housing for automatically electrocuting a rodent entering therein; said housing comprising a tube which is open at opposite ends, and having downwardly converging opposite side walls, a bait inside the center of said tube being affixed to the ceiling thereof, and an upwardly arched, elongated, flexible, spring steel ramp upon the floor of said housing; and said electrical mechanism comprising a switch mounted upon said floor and underneath said ramp, for being depressed thereby when a rodent walks thereupon heading for said bait, said switch being in an electrical circuit with a pair of elongated contact strips mounted along lower portions of facing sides of said side walls, and with an exterior electric power source.

2. The combination as set forth in claim 1, wherein said contact strips are a distance apart, to fit a body width of said rodent, so that a body of said rodent closes said circuit between said contact strips, as said ramp lowers down on said switch.

* * * * *